United States Patent
Lin et al.

(10) Patent No.: US 10,565,472 B2
(45) Date of Patent: Feb. 18, 2020

(54) EVENT IMAGE CURATION

(71) Applicant: Adobe Inc., San Jose, CA (US)

(72) Inventors: Zhe Lin, Fremont, CA (US); Yufei Wang, Mountain View, CA (US); Radomir Mech, Mountain View, CA (US); Xiaohui Shen, San Jose, CA (US); Gavin Stuart Peter Miller, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 74 days.

(21) Appl. No.: 15/935,816

(22) Filed: Mar. 26, 2018

(65) Prior Publication Data
US 2018/0211135 A1    Jul. 26, 2018

Related U.S. Application Data

(63) Continuation of application No. 15/177,197, filed on Jun. 8, 2016, now Pat. No. 9,940,544.

(51) Int. Cl.
*G06K 9/62* (2006.01)
*G06F 17/30* (2006.01)
(Continued)

(52) U.S. Cl.
CPC .......... *G06K 9/6218* (2013.01); *G06F 16/51* (2019.01); *G06F 16/58* (2019.01); *G06F 16/583* (2019.01); *G06K 9/00228* (2013.01); *G06K 9/00677* (2013.01); *G06K 9/00718* (2013.01); *G06K 9/00751* (2013.01); *G06K 9/4628* (2013.01); *G06K 9/628* (2013.01); *G06K 9/6215* (2013.01); *G06K 9/6254* (2013.01);
(Continued)

(58) Field of Classification Search
None
See application file for complete search history.

(56) References Cited

U.S. PATENT DOCUMENTS 7,472,096 B2    12/2008  Bruges
8,503,539 B2     8/2013  Tran
(Continued)

OTHER PUBLICATIONS

"Notice of Allowance", U.S. Appl. No. 15/177,121, dated Aug. 30, 2019, 10 pages.
(Continued)

*Primary Examiner* — Iman K Kholdebarin
(74) *Attorney, Agent, or Firm* — SBMC

(57) ABSTRACT

In embodiments of event image curation, a computing device includes memory that stores a collection of digital images associated with a type of event, such as a digital photo album of digital photos associated with the event, or a video of image frames and the video is associated with the event. A curation application implements a convolutional neural network, which receives the digital images and a designation of the type of event. The convolutional neural network can then determine an importance rating of each digital image within the collection of the digital images based on the type of the event. The importance rating of a digital image is representative of an importance of the digital image to a person in context of the type of the event. The convolutional neural network generates an output of representative digital images from the collection based on the importance rating of each digital image.

20 Claims, 8 Drawing Sheets

(51) Int. Cl.
*G06K 9/00* (2006.01)
*G06F 16/51* (2019.01)
*G06F 16/58* (2019.01)
*G06F 16/583* (2019.01)
*G06K 9/46* (2006.01)
*G06N 3/04* (2006.01)
*G06N 3/08* (2006.01)

(52) U.S. Cl.
CPC ......... *G06K 9/6255* (2013.01); *G06N 3/0454* (2013.01); *G06N 3/084* (2013.01)

(56) References Cited

U.S. PATENT DOCUMENTS

| | | | | |
|---|---|---|---|---|
| 8,571,331 | B2* | 10/2013 | Cifarelli | G06K 9/6226 382/224 |
| 9,031,953 | B2 | 5/2015 | Rathnavelu et al. | |
| 9,043,329 | B1 | 5/2015 | Patton et al. | |
| 9,465,993 | B2* | 10/2016 | Krupka | G06K 9/00677 |
| 9,535,960 | B2 | 1/2017 | Guo et al. | |
| 9,858,295 | B2* | 1/2018 | Murphy-Chutorian | G06F 16/5838 |
| 9,940,544 | B2* | 4/2018 | Lin | G06K 9/00228 |
| 10,002,310 | B2* | 6/2018 | Gopalan | G06F 16/51 |
| 10,324,973 | B2* | 6/2019 | Circlaeys | H04L 43/045 |
| 10,467,529 | B2 | 11/2019 | Lin et al. | |
| 2005/0220327 | A1* | 10/2005 | Itoh | G06K 9/00087 382/124 |
| 2015/0294219 | A1 | 10/2015 | Krizhevsky | |
| 2017/0357877 | A1 | 12/2017 | Lin et al. | |
| 2017/0357892 | A1 | 12/2017 | Lin et al. | |

OTHER PUBLICATIONS

"First Action Interview Office Action", U.S. Appl. No. 15/177,121, dated Jun. 4, 2019, 3 pages.
Chen,"Convolutional Neural Network and Convex Optimization", UCSD [Published 2014] Jan. 2014, 11 pages.
"Pre-Interview Communication", U.S. Appl. No. 15/177,197, dated Aug. 10, 2017, 3 pages.
"Notice of Allowance", U.S. Appl. No. 15/177,197, dated Nov. 27, 2017, 7 pages.
Chen,"Ranking Measures and Loss Functions in Learning to Rank", In Advances in Neural Information Processing Systems 22, 2009, 9 pages.
Krizhevsky,"ImageNet Classification with Deep Convolutional Neural Networks", In Advances in Neural Information Processing Systems 25, Dec. 3, 2012, 9 pages.
"Pre-Interview First Office Action", U.S. Appl. No. 15/177,121, dated Mar. 21, 2019, 4 pages.
Lu,"RAPID: Rating Pictorial Aesthetics using Deep Learning", ACM Multimedia, 2014., 2014, 10 pages.
Tzeng,"Simultaneous Deep Transfer Across Domains and Tasks", Oct. 2015, 9 pages.
Wang,"Unsupervised Learning of Visual Representations using Videos", Dec. 2015, pp. 2794-2802.
Wang,"Visual Tracking with Fully Convolutional Networks", Dec. 2015, pp. 3119-3127.
Xiong,"Recognize Complex Events from Static Images by Fusing Deep Channels", Jun. 2015, pp. 1600-1609.
Zagoruyko,"Learning to Compare Image Patches via Convolutional Neural Networks", Jun. 2015, pp. 4353-4361.

* cited by examiner

EVENT IMAGE CURATION

RELATED APPLICATIONS

This application is a continuation of and claims priority to U.S. patent application Ser. No. 15/177,197 filed Jun. 8, 2016, entitled "Event Image Curation", the disclosure of which is hereby incorporated by reference herein in its entirety.

BACKGROUND

Many types of devices today include a digital camera that can be used to capture digital photos, such as with a mobile phone, tablet device, a digital camera, and other electronic media devices. The accessibility and ease of use of the many types of devices that include a digital camera makes it quite easy for most anyone to take photos. For example, rather than just having one camera to share between family members, such as on vacation, at a wedding, or for other types of family outings, each person may have a mobile phone and/or another device, such as a digital camera, that can be used to take photos of the vacation, wedding, and other types of events. Additionally, a user with a digital camera device is likely to take many more photos than in days past with film cameras, and the family may come back from a vacation, a family outing, or other event with hundreds, or even thousands, of digital photos. Further, a large number of the photos may be centered around the more important or interesting moments of an event. For example, during a wedding, most everyone will take photos of the ceremony, the cake cutting, the first dance, and other important moments. This can lead to an oversized collection of photos in a personal digital photo album, as well as many of the photos from the different people, that are duplicative photos of a few particular moments during an event.

With the proliferation of digital imaging, many thousands of images can be uploaded and made available for both private and public viewing. However, photo curation, which is a practice of sorting, organizing, and/or selecting, e.g., for sharing, can be very time-consuming with a large number of photos. For example, it may take hours to select the best or most important photos from a large number of photos. The importance of photos is typically selected from the viewpoint of the person sharing the photos, which can limit which photos are curated. Another disadvantage is that conventional photo curation techniques focus mainly on image quality (e.g., focus, exposure, composition, framing, and the like), aesthetics, visual similarity, and diversity measures for photo curation of a digital photo album.

Increasingly, convolutional neural networks are being developed and trained for computer vision tasks, such as for the basic tasks of image classification, object detection, and scene recognition. Generally, a convolutional neural network is self-learning neural network of multiple layers that are progressively trained, for example, to initially recognize edges, lines, and densities of abstract features, and progresses to identifying object parts formed by the abstract features from the edges, lines, and densities. As the self-learning and training progresses through the many neural layers, the convolutional neural network can begin to detect objects and scenes, such for object and image classification. Additionally, once the convolutional neural network is trained to detect and recognize particular objects and classifications of the particular objects, multiple images can be processed through the convolutional neural network for object identification and image classification.

SUMMARY

Event image curation is described. In embodiments, an event image curation system curates images from a collection of digital images associated with a type of event. A computing device includes memory to store the collection of digital images associated with the type of event. The collection of digital images can be a digital photo album of digital photos that are associated with the type of event, or a video of image frames and the video is associated with the type of event. The computing device of the event image curation system executes a curation application that implements a convolutional neural network. The convolutional neural network receives an input of the digital images and a designation input of the type of event. The convolutional neural network can then determine an importance rating of each digital image within the collection of the digital images based on the type of event. The importance rating of a digital image is representative of an importance of the digital image to a person in context of the type of the event. Determining the "importance" of an image is a complex image property, related to other image aspects, such as memorability, specificity, popularity, as well as aesthetics and interestingness to persons. Further, images and/or video related to a specific event, such as a family vacation, wedding, or holiday gathering generally have an event-specific image importance, which pertains to human preferences related to images within the context of a digital photo album for a particular event type.

The curation application generates an output of representative digital images from the collection of digital images based on the importance rating of each digital image. For image frames of the video, the representative digital images are a set of the image frames of the video that are representative of important moments during the event. For photos in the digital photo album, the representative digital images are a set of the digital photos that are representative of important moments during the event. Further, the curation application can determine a diversity of the set of the digital photos to identify one or more of the digital photos that represent the important moments during the event. The diversity of the set of the digital photos pertains to a completeness of the representative digital photos, duplicates, and overall coverage to form the final curation of the collection of digital photos. The curation application may then remove duplicate ones of the set of the digital photos based on the determined diversity of the set of the digital photos, and/or add another one of the digital photos to the set of the digital photos for an important moment of the event that is not represented by the set of the digital photos.

In other aspects of event image curation, the collection of digital images associated with the type of event may include digital images that are associated with different types of events, such as may be related to important personal events, activity events, trip events, or holiday events. The convolutional neural network can receive the digital images that are associated with the different types of events along with probability designations of the different types of the events. The convolutional neural network can then determine the importance rating of each digital image based at least in part on the probability designations of the different types of the events. For example, the digital images may be associated with a wedding event that occurs during a family trip to Hawaii. To determine the representative photos that are representative of the important moments during the wedding event, the convolutional neural network can receive a user input of a higher probability designation that the digital images are associated with the wedding event, rather than just generally the family trip. Additionally, the convolutional neural network can receive an input of digital image metadata corresponding to each of the respective digital images, where the digital image metadata corresponding to a digital image indicates an importance of the digital image. The convolutional neural network can then determine the importance rating of each digital image based at least in part on the digital image metadata corresponding to each of the respective digital images.

In other aspects of event image curation, the curation application can implement a face detection algorithm that detects one or more faces in each of the digital images that include at least one face. The face detection algorithm generates a face heat map for each of the digital images that are detected having a face in the image. The face heat map for a particular digital image includes representations of the one or more faces emphasized based on an importance of a person in the context of the event type. The convolutional neural network can receive the face heat maps for each of the respective digital images as additional input. The convolutional neural network can then determine the importance rating of each digital image based at least in part on the face heat map for each of the respective digital images. The importance rating is a rating that indicates the importance of a digital image in the context of the event type, such as a digital image that includes faces of one or more persons who are important to an event (e.g., the bride and groom for a wedding event).

Additionally, the convolutional neural network can receive an input, such as a user input or a computer application input, of digital image metadata corresponding to each of the respective digital images, where the digital image metadata corresponding to a particular digital image designates the importance of the person or persons in the digital image. The convolutional neural network can then determine the importance rating of each digital image based at least in part on the digital image metadata corresponding to each of the respective digital images. Alternatively or in addition, the convolutional neural network can receive a user input to emphasize the importance of a person in a particular digital image, or to deemphasize the importance of the person in the digital image. The convolutional neural network can then determine the importance rating of each digital image based at least in part on the user input as it pertains to one or more of the digital images that include the person.

In similar aspects of event image curation, the curation application can implement a physical features detection algorithm. The physical features detection algorithm can detect physical features of persons in each of the digital images that include an image of at least one person. The physical features detection algorithm generates a representation of the one or more physical features for each of the digital images that are detected having an image of a person. The representation of physical features for a particular digital image includes individual representations of the one or more physical features emphasized based on an importance of a person, and the convolutional neural network can receive the physical features representations as additional input. The convolutional neural network can then determine the importance rating of each digital image based at least in part on the representations of the physical features for each of the respective digital images.

In other aspects of event image curation, the convolutional neural network can receive a sequence of items as an input, and determine an importance rating of each item within the sequence of the items. The curation application can then generate an output of representative items from the sequence based on the importance rating of each item. The importance rating of an item is representative of an importance of the item in context of the sequence. In implementations, the sequence of items may be photos of a digital photo album, and the representative items are a set of the digital photos of the photo album that summarize a narrative of the photo album. Similarly, the sequence of items may be image frames of a video, and the representative items are a set of the image frames of the video that summarize a narrative of the video. Similarly, the sequence of items may be multiple videos that each include image frames, and the representative items are a set of the image frames of one or more of the videos, where the set of the image frames summarize the sequence of the videos.

BRIEF DESCRIPTION OF THE DRAWINGS

Embodiments of event image curation are described with reference to the following Figures. The same numbers may be used throughout to reference like features and components that are shown in the Figures.

DETAILED DESCRIPTION

Figure 1:
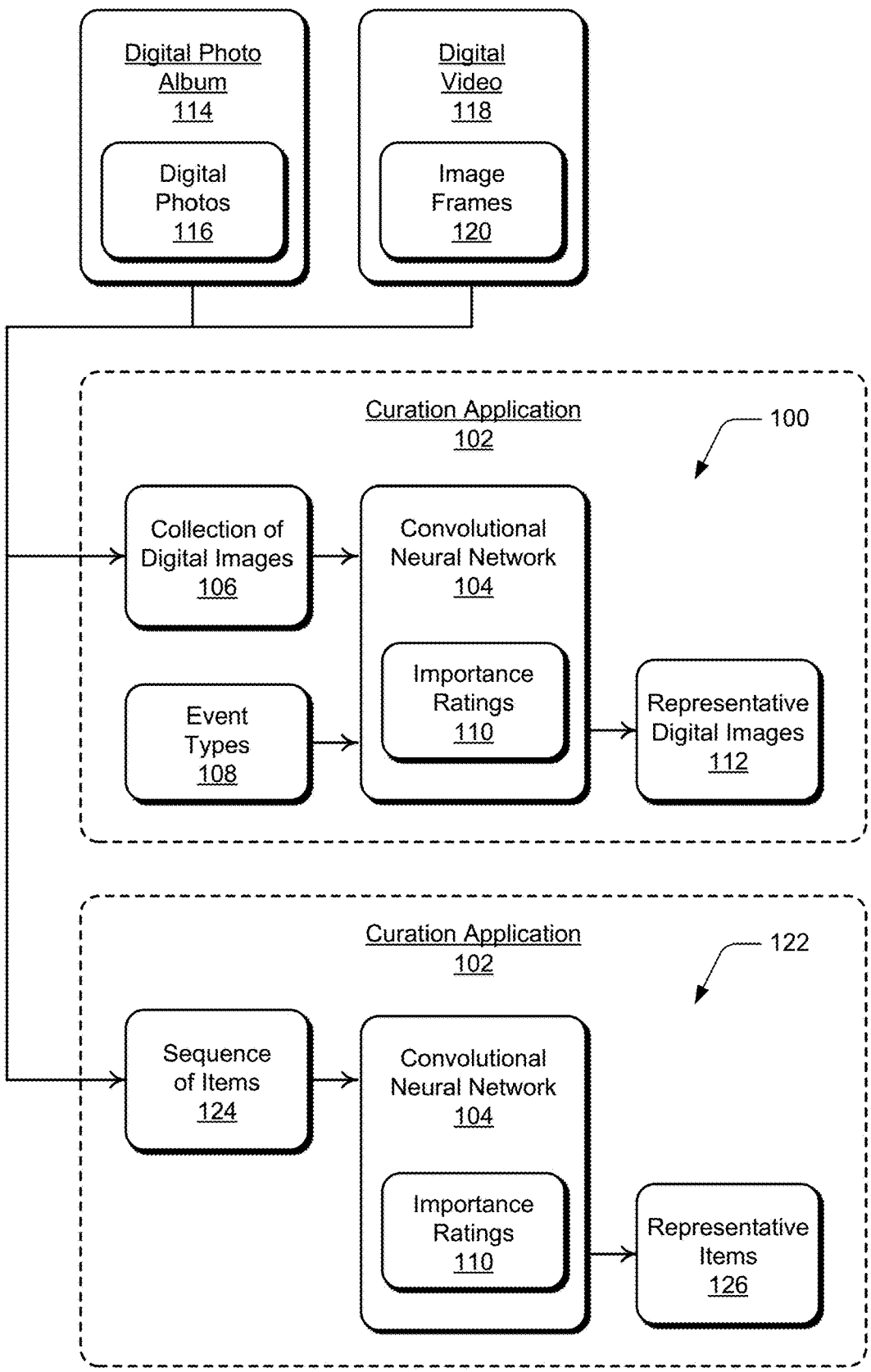
FIG. 1 illustrates example systems in which embodiments of event image curation can be implemented.

Embodiments of event image curation are implemented to provide techniques for determining an importance rating of digital images, such as for photo curation of a digital photo album, and an importance rating of video image frames, such as for video summarization. Determining the "importance" of an image is a complex image property, related to other image aspects, such as memorability, specificity, popularity, as well as aesthetics and interestingness to persons. Further, images and/or video related to a specific event, such as a family vacation, wedding, or holiday gathering generally have an event-specific image importance, which pertains to human preferences related to images within the context of a photo album for a particular event type. The techniques for determining representative digital images, such as digital photos of a photo album or video image frames of a video, based on importance ratings involves determining the more important images in context of a particular event. An importance rating is a rating that indicates the importance of a digital image in the context of the event type.

In other aspects of event image curation, the described techniques can generally be implemented to determine an importance rating of items within a sequence of the items, such as for a subset of items in the sequence. The sequence of items may be photos of a digital photo album, and the representative photos that summarize a narrative of the photo album are determined. Similarly, the sequence of items may be image frames of a video, and the representative image frames that summarize a narrative of the video are determined. Alternatively, the sequence of items may be multiple videos that each include image frames, and the representative image frames of one or more of the videos that summarize the sequence of the videos are determined.

Further, the techniques can be implemented for event summarization of photo and/or video collections that involves selecting the more important moments of a social event, with a focus towards common human preferences. For example, an entire digital photo album of a wedding event may have only one poorly lighted photo of the cake cutting ceremony, but the photo will be selected as one of the more important photos (e.g., a representative photo) of the event. This is quite different than conventional photo curation techniques that focus mainly on image quality, such as image focus, exposure, composition, framing, and the like. When a person creates a photo album of an event, a few of the representative images are typically selected to keep or share. There is generally an aspect of human nature, or some consistency, in the process of choosing the representative images that are important in context of the event, and discarding the unimportant images. Modeling this "human nature" selection process with the techniques for determining image importance and for video summarization can be implemented to assist automatic image selection and summarization of digital photo albums and video image frames.

Conventional automated image determination techniques do not take into account the type of event associated with and depicted in the photo images and/or in a video. Intuitively, the type of event associated with a digital photo album is an important criterion when determining and selecting representative images pertaining to the event. For example, if a task is to select the representative photos from a vacation to Hawaii, the photo of the volcano on the Big Island is an important representation of the vacation and an important photo to include in an importance determination. In contrast, if the photo album includes digital photos of a wedding ceremony, beautiful scenery is only the background to the event, and these type of images are not likely to be determined as more important, or representative, than the photos with primarily the bride and groom.

Given a photo album of digital images (e.g., photos) and the event type associated with the digital images of the photo album, a convolutional neural network learns to rank the subset of images which are the most representative images of the photo album, and ranks each of the images with an importance score based on the specific event type. The convolutional neural network implements a combinatorial optimization technique used to select the best subset of the photos of the event from the photo album. The combinatorial optimization technique takes into account both individual image importance in context of the event, and aesthetic score, as well as the diversity and coverage of the subset of photos. The resulting subset can be used, for example, to create an event book, photo collage, year book, photo album for printing and sharing, etc.

In other aspects, convolutional neural network joint training provides a progressive training technique, as well as a novel rank loss function, for convolutional neural networks. The progressive training technique can be implemented to simultaneously train classifier layers of a convolutional neural network on different data types, as described in greater detail below. Additionally, an existing or new convolutional neural network may be implemented with a piecewise ranking loss algorithm to implement the novel rank loss function, also described in greater detail below. A convolutional neural network is a machine learning computer algorithm implemented for self-learning with multiple layers that run logistic regression on data to learn features and train parameters of the network. The self-learning aspect is also referred to as unsupervised feature learning because the input is unknown to the convolutional neural network, in that the network is not explicitly trained to recognize or classify the data features, but rather trains and learns the data features from the input.

Typically, the multiple layers of a convolutional neural network, also referred to as neural layers, classifiers, or feature representations, include classifier layers to classify low-level, mid-level, and high-level features, as well as trainable classifiers in fully-connected layers. Generally, the low-level layers initially recognize edges, lines, colors, and/or densities of abstract features, and the mid-level and high-level layers progressively learn to identify object parts formed by the abstract features from the edges, lines, colors, and/or densities. As the self-learning and training progresses through the many classifier layers, the convolutional neural network can begin to detect objects and scenes, such as for object detection and image classification with the fully-connected layers. Additionally, once the convolutional neural network is trained to detect and recognize particular objects and classifications of the particular objects, multiple digital images can be processed through the convolutional neural network for object identification and image classification.

In accordance with the embodiments introduced herein, the classifier layers of a convolutional neural network are trained simultaneously on different data types. As convolutional neural networks continue to be developed and refined, the aspects of convolutional neural network joint training described herein can be applied to existing and new convolutional neural networks. Multiple digital image items of different data batches can be input to a convolutional neural network and the classifier layers of the convolutional neural network are jointly trained to recognize common features in the multiple digital image items of the different data batches. As noted above, the different data batches can be event types of different events, and the multiple digital image items of an event type may be groups of digital images, or digital videos, each associated with a type of the event. Generally, the multiple digital image items (e.g., the digital images or digital videos) of the different data batches have some common features. In other instances, the different data batches may be data sources other than digital images (e.g., digital photos) or digital videos. For example, the different data batches may include categories of data, metadata (tags), computer graphic sketches, three-dimensional models, sets of parameters, audio or speech-related data, and/or various other types of data sources. Further, the data batches may be based on time or a time duration. In general, the context of convolutional neural network joint training can be utilized to search any assets for which there is a meaningful and/or determinable interdependence.

The convolutional neural network can receive an input of the multiple digital image items of the different data batches, where the digital image items are interleaved in a sequence of item subsets from different ones of the different data batches. The classifier layers of the convolutional neural network can be jointly trained based on the input of these sequentially interleaved item subsets. Alternatively, the convolutional neural network can receive the input of the multiple digital image items of the different data batches, where the digital image items are interleaved as item subsets from random different ones of the different data batches. In this instance, the classifier layers of the convolutional neural network can be jointly trained based on the input of the random interleaved item subsets. The fully-connected layers of the convolutional neural network receive input of the recognized common features, as determined by the layers (e.g., classifiers) of the convolutional neural network. The fully-connected layers can distinguish between the recognized common features of multiple items of the different data batches.

Additionally, an existing or new convolutional neural network may be implemented with a piecewise ranking loss algorithm. Generally, ranking is used in machine learning, such as when training a convolutional neural network. A ranking function can be developed by minimizing a loss function on the training data that is used to train the convolutional neural network. Then, given the digital image items as input to the convolutional neural network, the ranking function can be applied to generate a ranking of the digital image items. In the disclosed aspects of convolutional neural network joint training, the ranking function is a piecewise ranking loss algorithm is derived from support vector machine (SVM) ranking loss, which is a loss function defined on the basis of pairs of objects whose rankings are different. The piecewise ranking loss algorithm is implemented for the convolutional neural network training to determine a relative ranking loss when comparing the digital image items from a batch of the items. The piecewise ranking loss algorithm implemented for convolutional neural network training improves the overall classification of the digital image items as performed by the fully-connected layers of the convolutional neural network. A convolutional neural network can also be implemented to utilize back propagation as a feed-back loop into the fully-connected layers of the convolutional neural network. The output generated by the piecewise ranking loss algorithm can be back propagated into the fully-connected layers to train regression functions of the convolutional neural network.

While features and concepts of event image curation can be implemented in any number of different devices, systems, networks, environments, and/or configurations, embodiments of event image curation are described in the context of the following example devices, systems, and methods.

FIG. 1 illustrates example systems in which embodiments of event image curation can be implemented. An example system 100 includes a curation application 102 that implements a convolutional neural network 104, which can receive an input of a collection of digital images 106 and a designation of an event type 108. The convolutional neural network 104 can then determine an importance rating 110 of each digital image 106 within the collection of the digital images based on the type of event, where the importance rating of a digital image is representative of an importance of the digital image to a person in context of the type of the event. The convolutional neural network 104 of the curation application 102 generates an output of representative digital images 112 from the collection based on the importance rating of each digital image. In implementations, the collection of digital images 106 can be a digital photo album 114 of photos 116 that are associated with an event type 108, or a digital video 118 of image frames 120 and the video is associated with the type of event.

Figure 5:
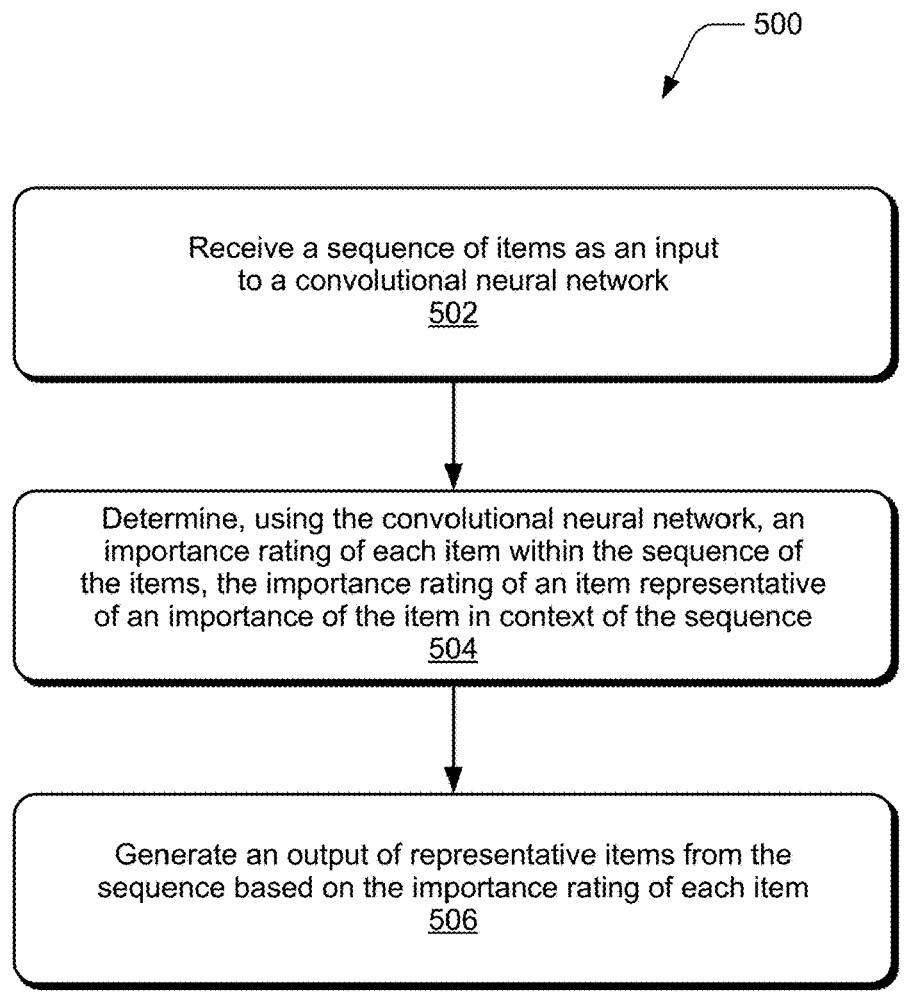
FIG. 5 illustrates example methods of event image curation in accordance with one or more embodiments of the techniques described herein.

As detailed in the system description shown in FIG. 5, the curation application 102 can be implemented as a computer software application that is executable with a processor (or with a processing system) of a computing device or computing system. Generally, the convolutional neural network 104 is a computer algorithm implemented for self-learning with multiple layers that run logistic regression on data to learn features and train parameters of the network. In aspects of event image curation, the convolutional neural network 104 can be utilized to rate image aesthetics or any other image attributes, used for image classification, image recognition, domain adaptation, and to recognize the difference between photos and graphic images. Although shown and described as a module or component of the curation application 102, the convolutional neural network 104 may be implemented as an independent computer software application in embodiments of event image curation. The convolutional neural network 104 is further shown and described with reference to FIG. 3.

As noted above, the convolutional neural network 104 determines the importance rating 110 of each digital image 106 within the collection of the digital images based on the event type 108. The importance rating 110 of a digital image 106 is representative of an importance of the digital image to a person in context of the type of the event. The convolutional neural network 104 of the curation application 102 generates the output of the representative digital images 112 from the collection based on the importance rating 110 of each digital image. As the image frames 120 of the digital video 118, the representative digital images 112 are a set of the image frames of the video that are representative of important moments during the event. As the photos 116 in the digital photo album 114, the representative digital images are a set of the digital photos that are representative of important moments during the event.

The collection of digital images 106 associated with an event type 108 may include digital images 106 that are associated with different types of events, such as may be related to important personal events, activity events, trip events, or holiday events. In implementations, many of the event types are known, or pre-designated as one of twenty-three (23) events that are generally segmented into four categories. A category of (1) important personal events includes wedding, birthday, and graduation events. A category of (2) personal activity events includes protest, personal music activity, religious activity, casual family gathering, group activity, personal sports, business activity, and personal art activity events. A category of (3) personal trip events includes architecture and/or art related trip, urban trip, cruise, nature trip, theme park, zoo, museum, beach, snow related, and sports game events. A category of (4) holiday events includes Christmas and Halloween.

In aspects of event image curation, the type of an event may be auto-detected, such as by the curation application 102 and/or by the convolutional neural network 104, can be user indicated or labeled, or can be identified by date and time criteria. Further, the collection of digital images 106 for a particular event can be segmented or split into different collections (e.g., different photo albums or different videos). For example, a photo album of photos associated with a wedding event can be segmented from other photos that are associated with the overall wedding weekend events with family and friends. Similarly, a photo album of photos associated with a wedding event in Hawaii can be segmented from other photos that are associated with the overall vacation event in Hawaii.

In other aspects of event image curation, the collection of digital images 106 associated with an event type 108 may include digital images that are associated with different types of the events (e.g., a mix of event types), such as may be related to important personal events, activity events, trip events, or holiday events. The convolutional neural network 104 can receive an input of the digital images 106 that are associated with the different types of events along with probability designations of the different types of the events. The convolutional neural network 104 can then determine the importance rating 110 of each digital image based at least in part on the probability designations of the different types of the events. For example, the digital images 106 may be associated with a wedding event that occurs during a family trip to Hawaii, and to determine the important photos that are representative of the important moments during the wedding event, the convolutional neural network 104 receives a user or application input of a higher probability designation that the digital images are associated with the wedding event, rather than just generally the family trip.

For a mix of the event types 108, the convolutional neural network 104 can determine the importance rating 110 (also referred to as a score prediction) based on an input of separate, different event types. The importance rating (predicted score) based on a single event type may miss certain photos of other event types that would otherwise be considered important or representative photos. The event type 108 associated with the photos 116 in a particular photo album 114 can be predicted, and the possibility vector P of event types W can be obtained as $W=\{w_1, \ldots, w_d\}$. The importance rating 110 (score prediction) of each digital image 106 is based on the top predicted event types as in the following Equation:

$$P = \sum_{i \in U} w_i \cdot P_i, \quad U = \left\{ i : w_i > \frac{1}{\gamma} \cdot \max\{w_j\} \right\}$$

where $P_i$ is the prediction of an image belonging to an event type i, and γ is a weighted factor of a predicted event type. The prediction P is the overall prediction of the image importance, after merging several possible event types based on the probability estimation of event types $w_i$. The j term indicates all possible event types, and $\max\{w_j\}$ is the maximum of the possibility w vector. The $$\frac{1}{\gamma} \cdot \max\{w_j\}$$

term is a threshold, and U is the set of i which satisfies the constraint: $w_i$ larger than the threshold. Therefore, only the several most possible event types ($W_i$) are selected to predict P.

Further, the curation application 102 can determine a diversity (also referred to as "joint curation") of the important digital images 112 with respect to representing the important moments during a type of event. The "diversity" as used herein pertains to a completeness of the important digital images, duplicates, and overall coverage to form the final curation of the collection of digital images 106. For example, the digital photos of a wedding event may include several photos of the bride and groom's first dance, in which case, duplicate photos can be removed from a set of the digital photos that are representative of the important moment during the wedding event. Alternatively, the cake cutting ceremony of the wedding event may only be represented by one of the digital photos, in which case, additional photos of the important moment during the wedding event are added to the set of the digital photos that represent the important moment. The curation application 102 can remove duplicate ones of the representative digital images 112 based on the determined diversity of the set of the representative digital images. Alternatively, based on the determined diversity, the curation application 102 can add another one of the digital images 112 as a representative image for an important moment of the event that is not represented by the set of the representative digital images 112. The curation application 102 can determine a subset of the digital photos 116 from the digital photo album 114, and the subset takes into account both individual image importance and aesthetic score, as well as the diversity and coverage of the subset of photos. The curation application 102 can implement the joint curation as in the following Equation:

$$S^* = \underset{S \subseteq A}{\mathrm{argmax}} \mathcal{F}(Imp(S), Aesth(S), Div(S), Cov(S, A))$$

where A is the original photo album, and S is the curated sub-album. Four cues are used to retrieve the combinatorial curated result: Imp(S) is the sum of predicted importance scores of all images in the sub-album; Aesth(S) is the sum of predicted aesthetic scores of all images in the sub-album; Div(S) is the diversity of the sub-album, which incorporates the idea of avoiding redundancy in S; and Cov(S) is the coverage of the sub-album, which incorporates the idea that S should be a good representative of A.

Another example system 122 includes the curation application 102 that implements the convolutional neural network 104 designed to receive an input as a sequence of items 124, and then determine an importance rating 110 of each item 124 in the sequence of the items. The convolutional neural network 104 of the curation application 102 generates an output of representative items 126 from the sequence of items based on the importance rating 110 of each item. In implementations, the sequence of items 124 may be the photos 116 of the digital photo album 114, and the representative items 126 are a set of the digital photos of the photo album that summarize a narrative of the photo album. Similarly, the sequence of items 124 may be the image frames 120 of a digital video 118, and the representative items 126 are a set of the image frames of the video that summarize a narrative of the video. Similarly, the sequence of items may be multiple videos 118 that each include image frames, and the representative items 126 are a set of the image frames of one or more of the videos, where the set of the image frames summarize the sequence of the videos. In general, the techniques described herein for event image curation can be implemented to search any items (e.g., images, photos, videos, assets, etc.) for which there is a meaningful interdependence in the sequence of the items.

Figure 2:
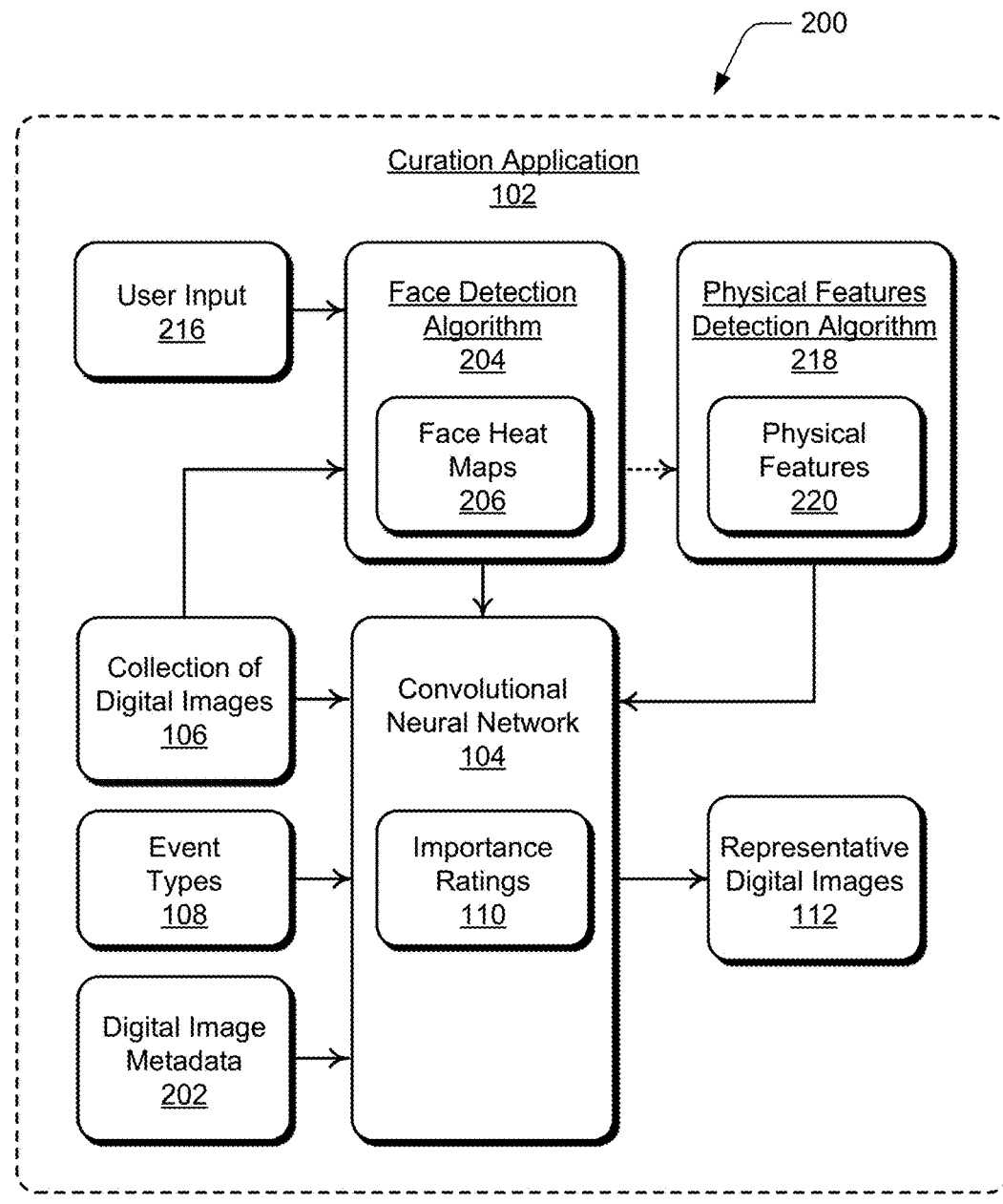
FIG. 2 illustrates another example system in which embodiments of event image curation can be implemented.
Figure 2:
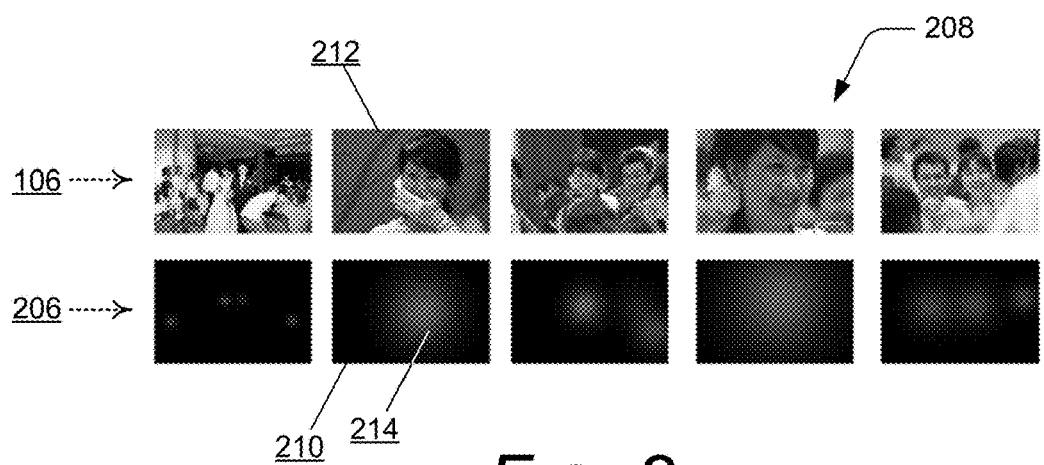

FIG. 2 further illustrates the example systems shown and described with reference to FIG. 1 in more detail, including features of the curation application 102 and the convolutional neural network 104 that may be implemented in embodiments of event image curation. An example system 200 includes the curation application 102 that implements the convolutional neural network 104, which receives the collection of digital images 106 and the designation of an event type 108 as described above. Further, the convolutional neural network 104 can then determine the importance rating 110 of each digital image 106 within the collection of the digital images based on the type of event. The convolutional neural network 104 of the curation application 102 generates the output of the representative digital images 112 from the collection of digital images 106 based on the importance rating 110 of each digital image. Additionally, the convolutional neural network can receive digital image metadata 202 corresponding to each of the respective digital images 106. The digital image metadata 202 indicates an importance of a respective digital image, and may be an input generated or applied by the curation application 102. The convolutional neural network 104 can then determine the importance rating 110 of each digital image 106 based at least in part on the digital image metadata 202 corresponding to each of the respective digital images.

In other aspects of event image curation, the curation application 102 can implement a face detection algorithm 204 that detects one or more faces in each of the digital images 106 that include at least one face. The face detection algorithm 204 generates a face heat map 206 for each of the digital images that are detected having a face in the image. In embodiments, the face detection algorithm 204 may also be implemented as a convolutional neural network trained for face detection. The face heat map 206 for a particular digital image includes representations of the one or more faces emphasized based on an importance of a person in the context of the event type 108. The convolutional neural network 104 can receive the face heat maps 206 for each of the respective digital images as additional input. The convolutional neural network 104 can then determine the importance rating 110 of each digital image 106 based at least in part on the face heat map 206 for each of the respective digital images. The importance rating 110 is a rating that indicates the importance of a digital image 106 in the context of the event type, such as a digital image that includes faces of one or more persons who are important to an event (e.g., the bride and groom for a wedding event).

The face heat maps 206 improves the performance of the convolutional neural network 104 determining the importance ratings, with important people in the digital images 106 emphasized in the face heat maps 206 with higher peak values. The importance ratings 110 of the digital images 106 can take into account the frequency of a particular face appearing in one or more of the digital images 106, where a face that appears more often is likely more important. The face detection algorithm 204 can also take into account the size of the face, position, and composition around the face in the digital images. Generally, the people or persons appearing in many of the digital photos of an event are important, such as for a wedding event (e.g., the bride and groom), birthday, family gathering, and the like.

In implementations, the face heat maps 206 can be generated to then train a shallow convolutional neural network 104 to predict the importance ratings 110 of the digital images 106, such as described with reference to the convolutional neural network shown in FIG. 3. The face detection algorithm 204 generates the face heat maps 206 by face detection in the digital images 106 and agglomerative identity clustering, where the faces of persons in the images are represented with Gaussian kernels, and important people are emphasized with a higher peak value. An implementation of the convolutional neural network, such as shown and described with reference to FIG. 3, can be trained to recognize different facial features and parts of faces, and concatenate the final fully-connected layers as the final face descriptor, followed by agglomerative identity clustering to obtain the frequency of faces in the collection of digital images 106.

As shown in the example 208, images in the second row are examples of the face heat maps 206 that correspond to digital images 106 depicting a wedding event. For example, a face heat map 210 corresponds to a particular digital image 212, and the face heat map 210 includes a representation 214 of the woman's face emphasized in the heat map. Important people captured in an image may also be identified in a corresponding face heat map with colored representations. Predictions from an original digital image 106 and the corresponding face heat map 206 can be combined according to the formulation in the following Equation:

$$P = P_1 \cdot \max\{P_f, \beta\}^2$$

where $(P_1, P_f)$ are predicted scores from the digital image and the face heat map, respectively, and $\beta$ is a constraint that can be utilized to reduce or eliminate outlier predictions by the convolutional neural network.

Additionally, the convolutional neural network can receive an input (e.g., as a user input or as an application input) of the digital image metadata 202 corresponding to a particular digital image 106, and the digital image metadata 202 designates the importance of the person or persons in a digital image. Similarly, a user input 216 can be received to emphasize the importance of a person in a particular digital image 106, or to deemphasize the importance of the person in the digital image. The convolutional neural network 104 can then determine the importance rating 110 of each digital image 106 based at least in part on the user input 216 as it pertains to one or more of the digital images that include the person. For example, a user may control the determined result of the representative digital images 112 by user input 216 to emphasize or deemphasize the importance of a person in one or more of the images, such as a waiter at a wedding event who inadvertently appears with more frequency in the background of the wedding photos and gets classified as an important face of the event. Additionally, the convolutional neural network 104 can receive an input of the digital image metadata 202 corresponding to a respective digital image 106, where the digital image metadata 202 indicates an importance of people in the image, such as to label one face for each family member at family gathering. For example, a wedding photographer can label the bride and groom in a wedding photo and then run the curation application to determine the representative digital images 112 based on the labeled wedding photo.

In similar aspects of event image curation and the face detection algorithm 204, the curation application 104 may also implement a physical features detection algorithm 218 that detects physical features of persons in each of the digital images 106 that include at least one person. The physical features of persons in the digital images may include facial expressions, body poses, detectable actions like dancing or other activity, and other types of detectable physical features. The physical features detection algorithm 218 (which may also be implemented as a convolutional neural network) detects physical features 220 for each of the digital images 106 that are detected as having a person in the image. The detected physical features 220 for a particular digital image includes representations of the one or more physical features emphasized based on an importance of a person, and the convolutional neural network 104 can receive the physical features 220 representations as additional input. The detected physical features 220 can be represented in various formats, such as similar to the face heat maps with the physical features emphasized, or in other forms of feature representations. The convolutional neural network 104 can then determine the importance rating 110 of each digital image 106 based at least in part on the detected physical features 220 for each of the respective digital images.

Figure 3:
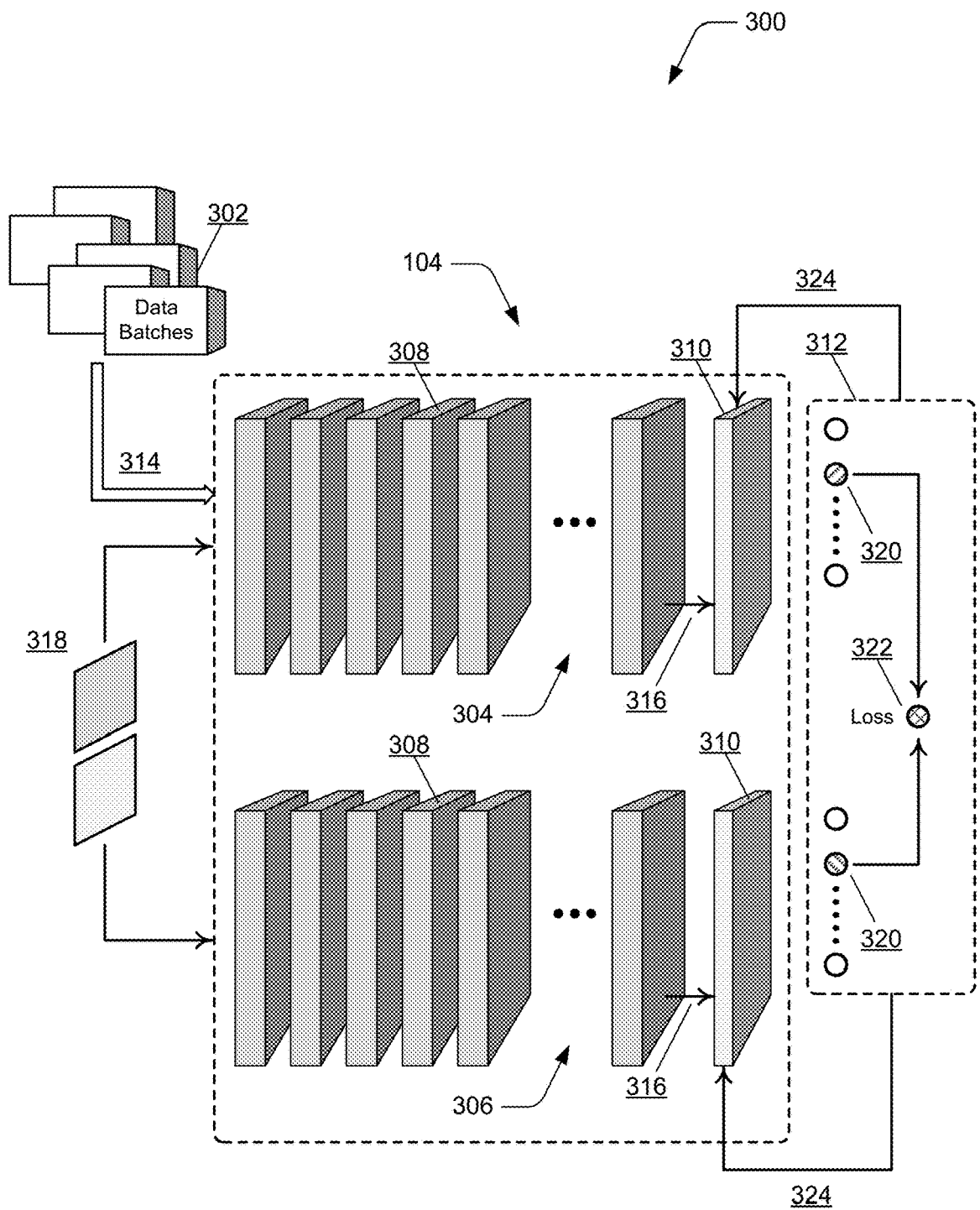
FIG. 3 illustrates an example convolutional neural network in a system in which embodiments of event image curation can be implemented.

FIG. 3 illustrates an example system 300 that includes the convolutional neural network 104 in which embodiments of event image curation can be implemented. Generally, a convolutional neural network is a computer algorithm implemented for self-learning with multiple layers that run logistic regression on data to learn features and train parameters of the network. In aspects of event image curation, the convolutional neural network 104 can be utilized to rate image aesthetics or any other image attributes, used for image classification, image recognition, domain adaptation, and to recognize the difference between photos and graphic images. In this example system 300, the data is different data batches 302 of multiple digital image items. In implementations, the different data batches 302 can be the event types 108 of different events, and the multiple digital image items of an event type can be the collections of digital images 106 each associated with a type of the event, such as a family vacation, a nature hike, a wedding, a birthday, or other type of gathering. Similarly, the multiple digital image items of an event type may be digital videos 118 each associated with a type of the event. Generally, the multiple digital image items (e.g., the digital images or digital videos) of the different data batches 302 have some common features.

In other instances, the data batches 302 may include data sources other than digital images (e.g., digital photos) or digital videos. For example, the different data batches may include categories of data, tags metadata, computer graphic sketches, three-dimensional models, sets of parameters, audio or speech-related data, and/or various other types of data sources. Further, the data batches may be based on time or a time duration. In general, the context of event image curation can be utilized to search any assets, such as the different data batches 302, for which there is a meaningful and/or determinable interdependence.

In this example system 300, the convolutional neural network 104 is implemented as two identical neural networks 304, 306 that share a same set of layer parameters of the respective network layers. As described herein, the two neural networks 304, 306 are collectively referred to in the singular as the convolutional neural network 104, and each of the neural networks include multiple classifier layers 308, fully-connected layers 310, and optionally, a layer to implement a piecewise ranking loss algorithm 312. The convolutional neural network 104 can receive an input 314 of the multiple digital image items of the different data batches 302. The classifier layers 308 of the convolutional neural network are jointly trained to recognize the common features in the multiple digital image items of the different data batches.

The multiple classifier layers 308 of the convolutional neural network 104, also referred to as neural layers, classifiers, or feature representations, include layers to classify low-level, mid-level, and high-level features, as well as trainable classifiers in the fully-connected layers 310. The low-level layers initially recognize edges, lines, colors, and/or densities of abstract features, and the mid-level and high-level layers progressively learn to identify object parts formed by the abstract features from the edges, lines, colors, and/or densities. As the self-learning and training progresses through the many classifier layers, the convolutional neural network 104 can begin to detect objects and scenes, such as for object detection and image classification with the fully-connected layers. The low-level features of the classifier layers 308 can be shared across the neural networks 304, 306 of the convolutional neural network 104. The high-level features of the fully-connected layers 310 that discern meaningful labels and clusters of features can be used to discriminate between the different data batch types, or generically discriminate between any type of assets.

The fully-connected layers 310 of the convolutional neural network 104 (e.g., the two neural networks 304, 306) each correspond to one of the different data batches 302. The fully-connected layers 310 receive input 316 of the recognized common features, as determined by the classifier layers 308 of the convolutional neural network. The fully-connected layers 310 can distinguish between the recognized common features of multiple digital image items of the different data batches 302 (e.g., distinguish between digital images of an event, or distinguish between image frames of digital videos of the event).

In aspects of convolutional neural network joint training, the classifier layers 308 of the convolutional neural network 104 are trained simultaneously on all of the multiple digital image items of the different data batches. The fully-connected layers 310 can continue to be trained based on outputs of the convolutional neural network being back propagated into the fully-connected layers that distinguish digital image items within a data batch type. The joint training of the convolutional neural network 104 trains the neural network in a hierarchical way, allowing the digital image items of the data batches 302 to be mixed initially in the classifier layers 308 (e.g., the low-level features) of the neural network. This can be used initially to train the convolutional neural network to predict importance of digital images, for example, without the digital images being associated with an event type. The feature sharing reduces the number of parameters in the convolutional neural network 104 and regularizes the network training, particularly for the high variance of digital image item types among the data batches 302 and for relatively small datasets.

The convolutional neural network 104 can receive an input of the multiple digital image items of the different data batches 302, where the digital image items are interleaved in a sequence of item subsets from different ones of the different data batches. The classifier layers 308 of the convolutional neural network are trained based on the input of these sequentially interleaved item subsets. Alternatively, the convolutional neural network 104 can receive the input of the multiple digital image items of the different data batches 302, where the digital image items are interleaved as item subsets from random different ones of the different data batches. In this instance, the classifier layers 308 of the convolutional neural network are trained based on the input of the random interleaved item subsets. The input of the multiple digital image items can be interleaved in sequence or interleaved randomly to prevent the convolutional neural network 104 from becoming biased toward one type of digital image item or set of digital image items, and the training iterations develop the classifier layers 308 of the convolutional neural network gradually over time, rather than changing abruptly. In implementations, interleaving the input of the digital image items can be a gradient descent-based method to train the weight so that it is gradually updated. This is effective to avoid bias during training of the convolutional neural network and to avoid overfitting the data items for smaller data batches.

In embodiments, an existing or new convolutional neural network may be implemented with the piecewise ranking loss algorithm 312. Generally, ranking is used in machine learning, such as when training a convolutional neural network. A ranking function can be developed by minimizing a loss function on the training data that is used to train the convolutional neural network. Then, given the digital image items as input to the convolutional neural network, the ranking function can be applied to generate a ranking of the digital image items. In the disclosed aspects of convolutional neural network joint training, the ranking function is a piecewise ranking loss algorithm is derived from support vector machine (SVM) ranking loss, which is a loss function defined on the basis of pairs of objects whose rankings are different.

In this example system 300, the two identical neural networks 304, 306 of the convolutional neural network 104 receive item pairs 318 of the multiple digital image items of one of the different batches 302. Each of the neural networks 304, 306 generate an item score 320 for one of the item pairs. The piecewise ranking loss algorithm 312 can determine a scoring difference 322 (e.g., determined as a "loss") between the item pairs of the multiple digital image items. The piecewise ranking loss algorithm 312 is utilized to maintain the scoring difference between the item pairs 318 if the score difference between an item pair exceeds a margin. The piecewise ranking loss algorithm 312 determines a relative ranking loss when comparing the digital image items from a batch of the items. The scoring difference between an item pair is relative, and a more reliable indication for determining item importance.

In this example system 300, the convolutional neural network 104 is also implemented to utilize back propagation 324 as a feed-back loop into the fully-connected layers 310 of the convolutional neural network. The scoring difference 322 output of the piecewise ranking loss algorithm 312 is back-propagated 324 to train regression functions of the fully-connected layers 310 of the convolutional neural network 104. The piecewise ranking loss algorithm 312 can evaluate every possible image pair of the digital image items with any score difference from a data batch 302.

As noted above, the piecewise ranking loss algorithm 312 is derived from SVM (support vector machine) ranking loss, and in implementations of SVM ranking loss, the item pairs 318 selected for training are image pairs with a score difference larger than a margin, where $D_g = G(I_1) - G(I_2) >$ margin. The loss function is as in Equation(1):

$$L(I_1, I_2) = \frac{1}{2}\{\max(0, \text{margin} - D_p)\}^2, D_g > \text{margin}$$

$$D_p = P(I_1) - P(I_2)$$

where P is the predicted importance score of image, which is just the penultimate layer of the network, and $(I_1; I_2)$ are the input image pair sorted by scores. The loss functions of SVM ranking loss have the following form:

$$L^\rho(f; x; \mathcal{L}) = \sum_{s=1}^{n-1} \sum_{i=1, l(i)<l(s)}^{n} \phi(f(x_s) - f(x_i))$$

where the $\phi$ functions are hinge function ($\phi(z)=(1-z)_+$), exponential function ($\phi(z)=e^{-z}$), and logistic function ($\phi(z)= \log(1+e^{-z})$ respectively, for the three algorithms.

Then, the piecewise ranking loss implementation is as in Equation(2):

$$L(I_1, I_2) = \begin{cases} \frac{1}{2}\{\max(0, \text{margin}_1 - D_p)\}^2 + \\ \\ \frac{1}{2}\{\max(0, |D_p| - \text{margin}_1)\}^2, D_g < \text{margin}_1 \\ \frac{1}{2}\{\max(0, D_p - \text{margin}_2)\}^2, \text{margin}_1 < D_g < \text{margin}_2 \\ \frac{1}{2}\{\max(0, \text{margin}_2 - D_p)\}^2, D_g > \text{margin}_2 \end{cases}$$

where $\text{margin}_1 < \text{margin}_2$ are the similar, different margins, respectively. The piecewise ranking loss algorithm 312 makes use of image pairs with any score difference. For a score difference between an item pair $D_g = s1-s2$, the piecewise ranking loss algorithm determines a predicted scoring difference $D_p$ similar to $D_g$. If the score difference $D_g$ is small (i.e., $D_g <$ margin1), the predicted loss reduces the predicted scoring difference $D_p$. If the score difference $D_g$ is large (i.e., $D_g >$ margin2), the piecewise ranking loss algorithm increases the predicted scoring difference $D_p$ and penalizes it when $D_p <$ margin2. Similarly, when $D_g$ is in the range between margin1 and margin2, the piecewise ranking loss algorithm determines the predicted scoring difference $D_p$ also within that range. The implementation of piecewise ranking loss trained on the different data batches 302 outperforms both SVM ranking loss and a baseline KNN-based method. The objective loss function of the piecewise ranking loss algorithm provides an error signal even when image pairs have the same rating, moving them closer together in representational space, rather than training only on images with different ratings, and also introduces relaxation in the scoring, thus making the network more stable, which is beneficial when the ratings are subjective.

Figure 4:
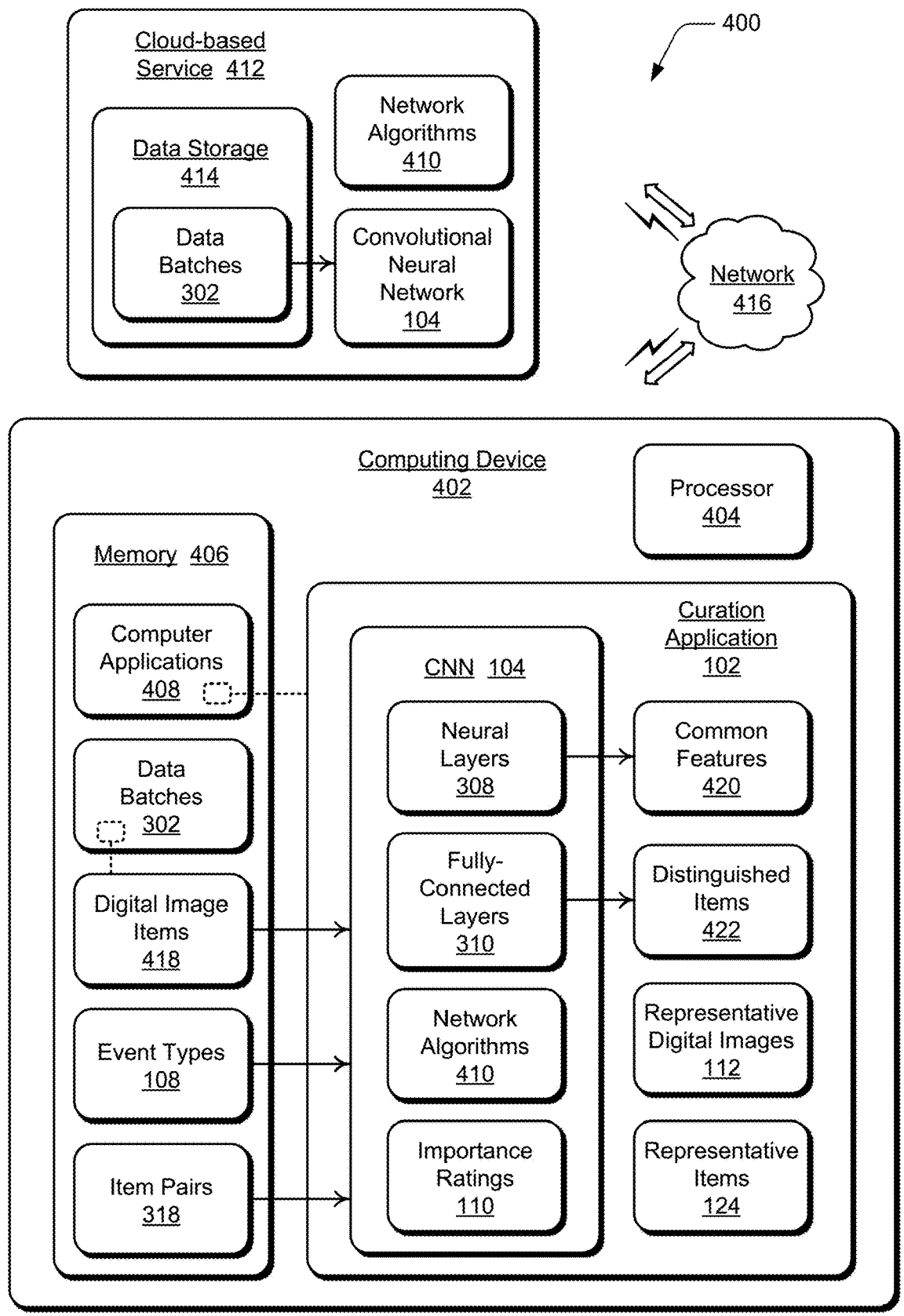
FIG. 4 illustrates another example system in which embodiments of event image curation can be implemented.

FIG. 4 illustrates an example system 400 in which embodiments of event image curation can be implemented. The example system 400 includes a computing device 402, such as a computer device that implements the convolutional neural network 104 as a computer algorithm implemented for self-learning, as shown and described with reference to FIGS. 1-3. The computing device 402 can be implemented with various components, such as a processor 404 (or processing system) and memory 406, and with any number and combination of differing components as further described with reference to the example device shown in FIG. 8. Although not shown, the computing device 402 may be implemented as a mobile or portable device and can include a power source, such as a battery, to power the various device components. Further, the computing device 402 can include different wireless radio systems, such as for Wi-Fi, Bluetooth™, Mobile Broadband, LTE, or any other wireless communication system or format. Generally, the computing device 402 implements a communication system (not shown) that includes a radio device, antenna, and chipset that is implemented for wireless communication with other devices, networks, and services.

As described herein, techniques for convolutional neural network joint training provide a progressive training technique (e.g., joint training), which may be implemented for existing and new convolutional neural networks. The disclosed techniques also include implementation of the piecewise ranking loss algorithm 312 as a layer of the convolutional neural network 104. The computing device 402 includes one or more computer applications 408, such as the curation application 102, the convolutional neural network 104, and the network algorithms 410 (e.g., the piecewise ranking loss algorithm 312, the face detection algorithm 204, and/or the physical features detection algorithm 218) to implement the techniques for event image curation. The curation application 102, the convolutional neural network 104, and the network algorithms 410 can each be implemented as software applications or modules (or implemented together), such as computer-executable software instructions that are executable with the processor 404 (or with a processing system) to implement embodiments of the convolutional neural network described herein. The curation application 102, the convolutional neural network 104, and the network algorithms 410 can be stored on computer-readable storage memory (e.g., the device memory 406), such as any suitable memory device or electronic data storage implemented in the computing device. Although shown as an integrated modules or components of the convolutional neural network 104, the network algorithms 410 may be implemented as separate modules or components with any of the computer applications 408. Further, as noted above, the face detection algorithm 204 and/or the physical features detection algorithm 218 may also be implemented themselves as a convolutional neural network to train on the detection features.

In embodiments, the convolutional neural network 104 (e.g., the two neural networks 304, 306) is implemented to receive an input of the multiple digital image items of the different data batches 302 that are stored in the memory 406 of the computing device 402. Alternatively or in addition, the convolutional neural network 104 may receive multiple digital image items of the different data batches as input from a cloud-based service 412. The example system 200 can include the cloud-based service 412 that is accessible by client devices, to include the computing device 402. The cloud-based service 412 includes data storage 414 that may be implemented as any suitable memory, memory device, or electronic data storage for network-based data storage. The data storage 414 can maintain the data batches 302 each including the digital image items 212. The cloud-based service 412 can implement an instance of the convolutional neural network 104, to include the network algorithms 410, as network-based applications that are accessible by a computer application 408 from the computing device 402.

The cloud-based service 412 can also be implemented with server devices that are representative of one or multiple hardware server devices of the service. Further, the cloud-based service 412 can be implemented with various components, such as a processing system and memory, as well as with any number and combination of differing components as further described with reference to the example device shown in FIG. 8 to implement the services, applications, servers, and other features of event image curation. In embodiments, aspects of event image curation as described herein can be implemented by the convolutional neural network 104 at the cloud-based service 412 and/or may be implemented in conjunction with the convolutional neural network 104 that is implemented by the computing device 402.

The example system 200 also includes a network 416, and any of the devices, servers, and/or services described herein can communicate via the network, such as for data communication between the computing device 402 and the cloud-based service 412. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

In embodiments, the convolutional neural network 104 (e.g., the two neural networks 304, 306) receives an input of the multiple digital image items 418 of the different data batches 302. The classifier layers 308 of the convolutional neural network are trained to recognize the common features 420 in the multiple digital image items of the different data batches. Generally, the multiple digital image items of the data batches 302 have some common features. The classifier layers 308 of the convolutional neural network 104 are trained simultaneously on all of the multiple digital image items of the different data batches 302, except for the fully-connected layers 310. The fully-connected layers 310 of the convolutional neural network 104 each correspond to one of the different data batches. The fully-connected layers 310 receive input of the recognized common features 420, as determined by the classifier layers of the convolutional neural network. The fully-connected layers 310 can distinguish items 422 between the recognized common features of the multiple digital image items of the different data batches (e.g., distinguish between digital images of an event, or distinguish between image frames of digital videos of the event).

In embodiments of event image curation, the convolutional neural network 104 receives an input of the collection of digital images 106 (e.g., the data batches 302) and a designation of an event type 108. As noted above, the data batches 302 can include the collection of digital images 106, which is also representative of a digital photo album 114 of photos 116 that are associated with an event type 108. Similarly, the collection of digital images 106 may be representative of a digital video 118 of image frames 120 and the video is associated with the type of event. The convolutional neural network 104 can then determine the importance rating 110 of each digital image 106 within the collection of the digital images based on the type of event, and the curation application 102 generates an output of the important digital images 112 based on the importance rating of each digital image. Similarly, the convolutional neural network 104 can receive as input the sequence of items 124 (e.g., the data batches 302), and then determine the importance rating 110 of each item 124 in the sequence of the items. The curation application 102 can then generate the output of important items 126 from the sequence of items based on the importance rating 110 of each item.

Example methods 500, 600, and 700 are described with reference to respective FIGS. 5, 6, and 7 in accordance with one or more embodiments of event image curation, and convolutional neural network joint training. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

FIG. 5 illustrates example method(s) 500 of event image curation, and is generally described with reference to the curation application and convolutional neural network implemented in the example systems shown and described with reference to FIGS. 1-4. The order in which the method is described is not intended to be construed as a limitation, and any number or combination of the method operations can be combined in any order to implement a method, or an alternate method.

At 502, a sequence of items is received as an input to a convolutional neural network. For example, the convolutional neural network 104 receives the sequence of items 124 as an input. The sequence of items 124 may be the photos 116 of the digital photo album 114, the image frames 120 of a digital video 118, or multiple videos 118 that each include image frames. In general, the techniques described herein for event image curation can be implemented to search any items (e.g., images, photos, videos, assets, etc.) for which there is a meaningful interdependence in the sequence of the items.

At 504, an importance rating of each item within the sequence of the items is determined using the convolutional neural network, where the importance rating of an item is representative of an importance of the item in context of the sequence. For example, the convolutional neural network 104 determines the importance rating 110 of each item 124 in the sequence of items, and the importance rating of an item 124 is representative of an importance of the item in context of the sequence. At 506, an output of representative items is generated from the sequence based on the importance rating of each item. For example, the curation application 102 generates the representative items 126 from the sequence of items 124 based on the importance rating 110 of each item. For the photos 116 of the digital photo album 114, the representative items 126 are a set of the photos of the photo album that summarize a narrative of the photo album. Similarly, for the image frames 120 of a digital video 118, the representative items 126 are a set of image frames of the video that summarize a narrative of the video. Similarly, for multiple videos 118 that each include image frames, the representative items 126 are a set of image frames of one or more of the videos, where the set of the image frames summarize the sequence of the videos.

Figure 6:
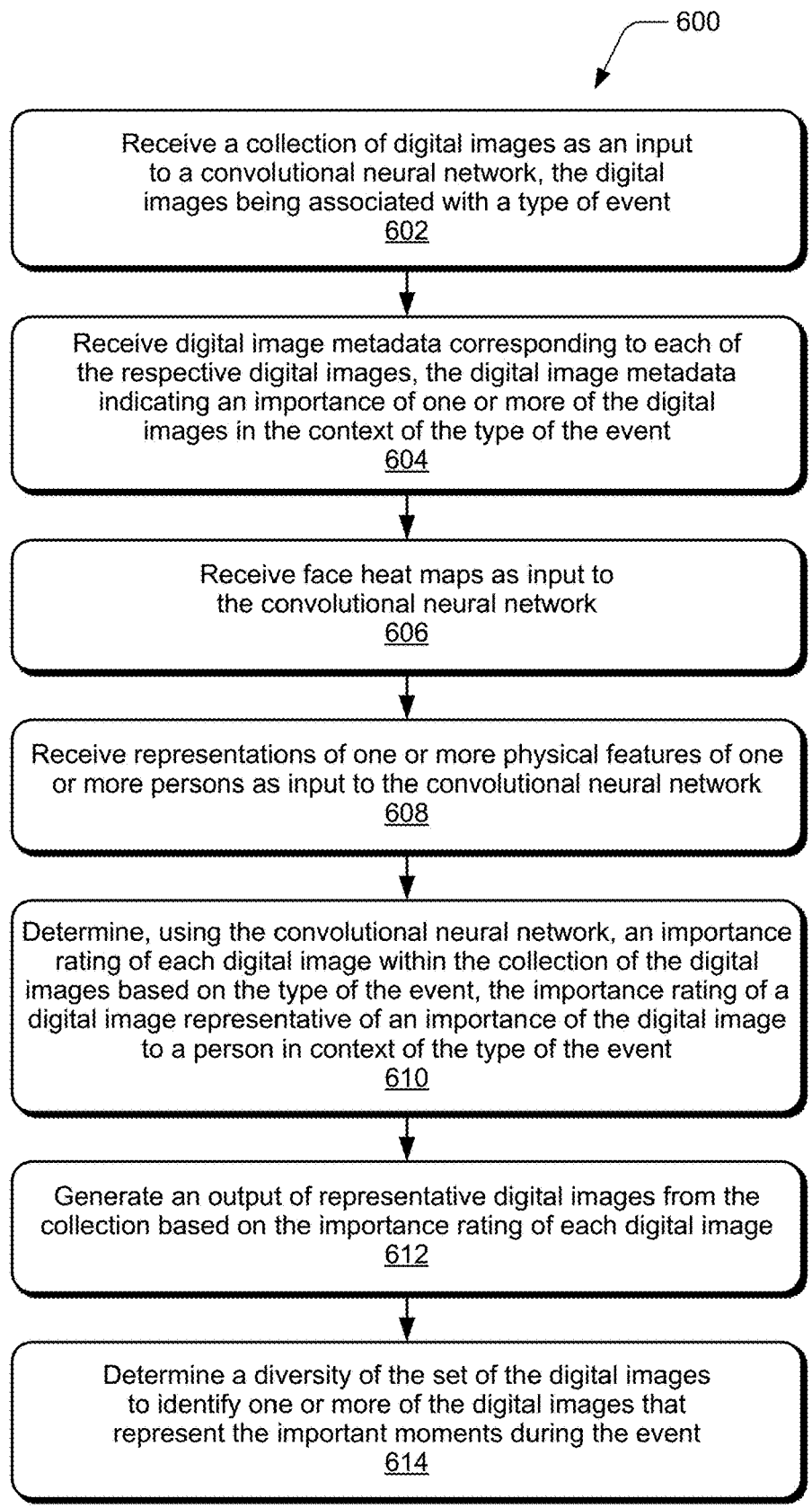
FIG. 6 illustrates example methods of event image curation in accordance with one or more embodiments of the techniques described herein.

FIG. 6 illustrates example method(s) 600 of event image curation, and is generally described with reference to the curation application and convolutional neural network implemented in the example systems shown and described with reference to FIGS. 1-4. The order in which the method is described is not intended to be construed as a limitation, and any number or combination of the method operations can be combined in any order to implement a method, or an alternate method.

At 602, a collection of digital images is received as an input to a convolutional neural network, the digital images being associated with a type of event. For example, the convolutional neural network 104 receives an input of the collection of digital images 106, and optionally, the input to the convolutional neural network 104 includes a designation of an event type 108. The collection of digital images 106 may be the digital photo album 114 of the photos 116 that are associated with an event type 108, or may be the video 118 of the image frames 120 and the video is associated with the event type 108. In implementations, the digital images may be associated with different types of the events, and the input to the convolutional neural network 104 includes probability designations of the different types of the events.

At 604, digital image metadata corresponding to each of the respective digital images is received as an additional input to the convolutional neural network, the digital image metadata that corresponds to a digital image indicating an importance of the digital image in the context of the type of the event. For example, the convolutional neural network 104 receives the digital image metadata 202 corresponding to each of the respective digital images 106, and the digital image metadata 202 indicates an importance of a respective digital image in the context of the type of the event.

At 606, face heat maps are received as input to the convolutional neural network. For example, the convolutional neural network 104 receives the face heat maps 206 as an optional, additional input. The face detection algorithm 204 detects faces in each of the digital images 106 that include at least one face, and generates a face heat map 206 for each of the digital images that are detected having a face in the image. The face heat map 206 of a digital image 106 includes representations of the one or more faces emphasized based on an importance of a person in the context of the type of event. The convolutional neural network 104 can also receive the digital image metadata 202 corresponding to a digital image 106 designating the importance of the person in the digital image. Similarly, the convolutional neural network 104 can receive a user input 216 to emphasize the importance of the person in a digital image 106 or deemphasize the importance of the person in the digital image.

At 608, representations of one or more physical features of one or more persons in the digital images are received as input to the convolutional neural network. For example, the convolutional neural network 104 receives the physical features 220 representations as an optional, additional input. The physical features detection algorithm 218 detects physical features of one or more persons in each of the digital images that include an image of at least one person. The physical features detection algorithm 218 generates a representation of the features 220 for each of the digital images 106 that are detected having at least one person. The physical features 220 of a digital image 106 includes representations of the physical features emphasized based on an importance of a person in the context of the type of the event.

At 610, an importance rating of each digital image within the collection of the digital images is determined based on the type of the event, the importance rating of a digital image representative of an importance of the digital image to a person in context of the type of the event. For example, the convolutional neural network 104 determines the importance rating 110 of each digital image 106 within the collection of the digital images based on the event type 108, where importance rating 110 of a digital image 106 is representative of an importance of the digital image to a person in context of the event type 108. For the digital images that may be associated with different types of the events, the convolutional neural network 104 determines the importance rating 110 of each digital image 106 based at least in part on the probability designations of the different types of the events. The convolutional neural network 104 can also determine the importance rating 110 of each digital image 106 based at least in part on the digital image metadata 202 that corresponds to each of the respective digital images. The convolutional neural network 104 can also determine the importance rating 110 of each digital image 106 based at least in part on the face heat map 206 for each of the respective digital images. The convolutional neural network 104 can also determine the importance rating 110 of each digital image 106 based at least in part on the physical features 220 representations for each of the respective digital images.

At 612, an output of representative digital images is generated from the collection based on the importance rating of each digital image. For example, the convolutional neural network 104 of the curation application 102 generates the representative digital images 112 from the collection of digital images 106 based on the importance rating 110 of each digital image. For the photos 116 of the digital photo album 114, the representative digital images 112 are a set of the digital photos that are representative of important moments during the event.

At 614, a diversity of the set of the digital images is determined to identify one or more of the digital images that represent the important moments during the event. For example, the curation application 102 determines a diversity (also referred to herein as joint curation) of the set of the digital images 112 to identify one or more of the digital images that represent the important moments during an event. The diversity of the set of the digital images pertains to a completeness of the representative digital images, duplicates, and overall coverage to form the final curation of the collection of digital images 106. The curation application 102 removes duplicate ones of the set of the digital images 112 based on the determined diversity of the set of the digital images, and/or adds another one of the digital images 112 for an important moment of the event that is not represented by the set of the digital images 112.

Figure 7:
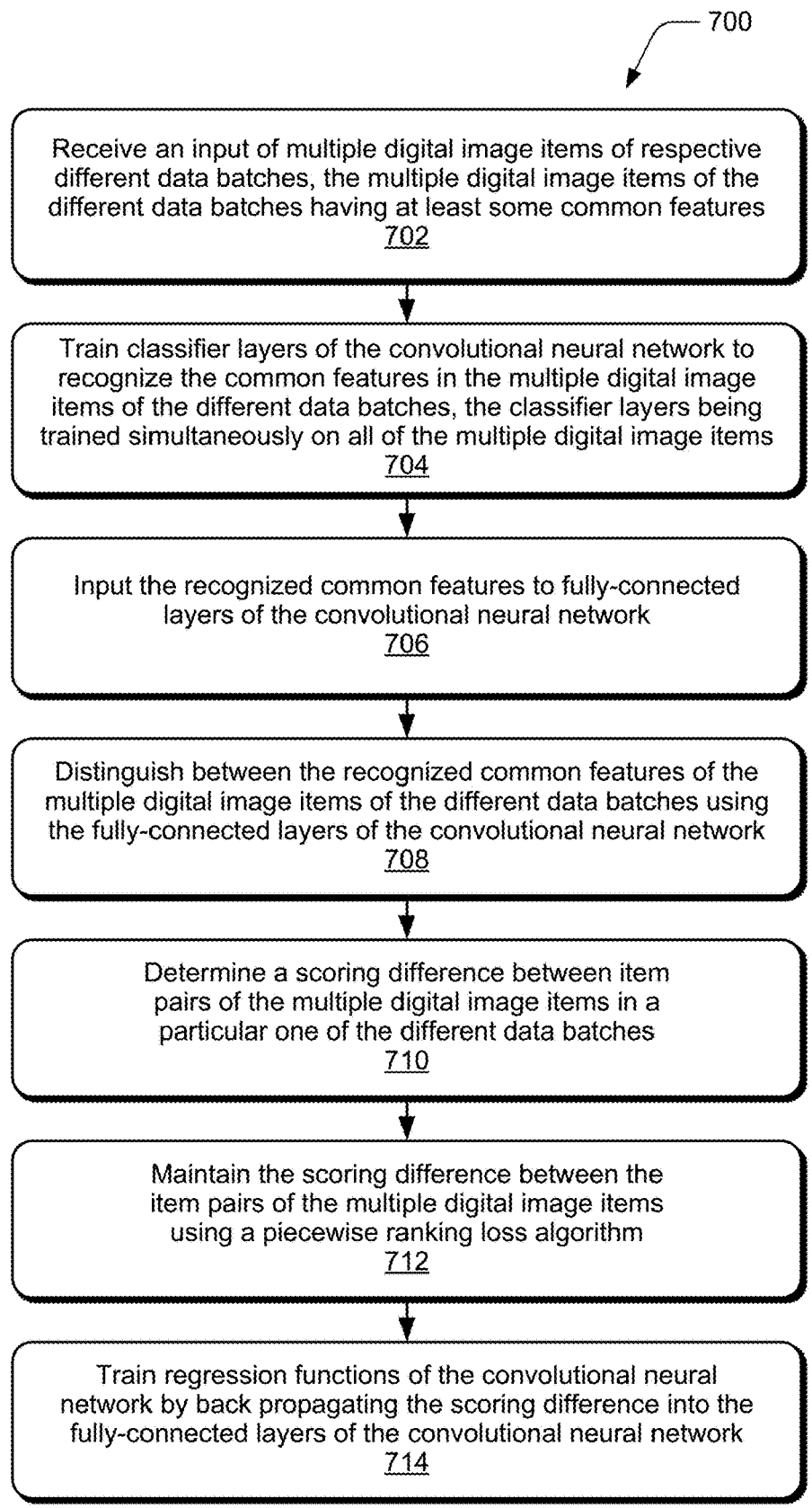
FIG. 7 illustrates example methods of convolutional neural network joint training in accordance with one or more embodiments of the techniques described herein.

FIG. 7 illustrates example method(s) 700 of convolutional neural network joint training, and is generally described with reference to the convolutional neural network implemented in the example system of FIG. 3. The order in which the method is described is not intended to be construed as a limitation, and any number or combination of the method operations can be combined in any order to implement a method, or an alternate method.

At 702, an input of multiple digital image items of respective different data batches is received, where the multiple digital image items of the different data batches have at least some common features. For example, the convolutional neural network 104 receives the input 314 of the multiple digital image items from the different data batches 302. In implementations, the different data batches 302 can be the event types 108 of different events. The multiple digital image items of an event type can be collection of digital images 106 each associated with a type of the event, such as a family vacation, a nature hike, a wedding, a birthday, or other type of gathering. Similarly, the multiple digital image items of an event type may be digital videos each associated with a type of the event. Generally, the multiple items (e.g., the digital images or digital videos) of the different data batches 302 have some common features with the multiple digital image items of the other different data batches. Further, the convolutional neural network 104 can receive the input 314 of the multiple digital image items from the different data batches 302, where the digital image items are interleaved in a sequence of item subsets from different ones of the different data batches. Alternatively, the convolutional neural network 104 can receive the input 314 of the multiple digital image items of the respective different data batches 302, where the digital image items are interleaved as item subsets from random different ones of the different data batches.

At 704, classifier layers of the convolutional neural network are trained to recognize the common features in the multiple digital image items of the different data batches, the classifier layers being trained simultaneously on all of the multiple digital image items of the different data batches. For example, the classifier layers 308 of the convolutional neural network 104 are trained simultaneously except for the fully-connected layers 310. The classifier layers 308 are trained to recognize the common features 420 in the multiple digital image items of the different data batches 302. The training of the classifier layers 308 of the convolutional neural network 104 can be based on the input of the sequential interleaved item subsets, or the training of the classifier layers 308 can be based on the input of the random interleaved item subsets.

At 706, the recognized common features are input to the fully-connected layers of the convolutional neural network. Further, at 708, the recognized common features of the multiple digital image items of the different data batches are distinguished using the fully-connected layers of the convolutional neural network. For example, the fully-connected layers 310 of the convolutional neural network 104 receive input 316 of the recognized common features 420. Each of the fully-connected layers 310 corresponds to a different one of the data batches 302 and is implemented to distinguish between the multiple digital image items of a respective one of the data batches, such as to distinguish between the digital images of an event or to distinguish between the image frames of digital videos of an event.

At 710, a scoring difference is determined between item pairs of the multiple digital image items in a particular one of the different data batches. For example, the convolutional neural network 104 is implemented as the two identical neural networks 304, 306 that share a same set of layer parameters of the respective network layers (e.g., the classifier layers 308 and the fully-connected layers 310). The two neural networks 304, 306 of the convolutional neural network 14 receive item pairs 318 of the multiple digital image items of one of the different data batches 302. Each of the neural networks 304, 306 generate an item score 320 for an item pair of the multiple digital image items from a particular one of the different data batches.

At 712, the scoring difference between the item pairs of the multiple digital image items is maintained with implementations of a piecewise ranking loss algorithm. For example, the convolutional neural network 104 implements the piecewise ranking loss algorithm 312 that determines the scoring difference 322 (e.g., determined as a "loss") between the item pairs of the multiple input device items. The piecewise ranking loss algorithm 312 maintains the scoring difference between the item pairs 318 of the multiple digital image items if the score difference between the item pair exceeds a margin.

At 714, regression functions of the convolutional neural network are trained by back propagating the maintained scoring difference into the fully-connected layers of the convolutional neural network. For example, the convolutional neural network 104 utilizes back propagation 324 as a feed-back loop to back propagate the scoring difference 322 into the fully-connected layers 310 of the convolutional neural network 104 to train regression functions of the convolutional neural network.

Figure 8:
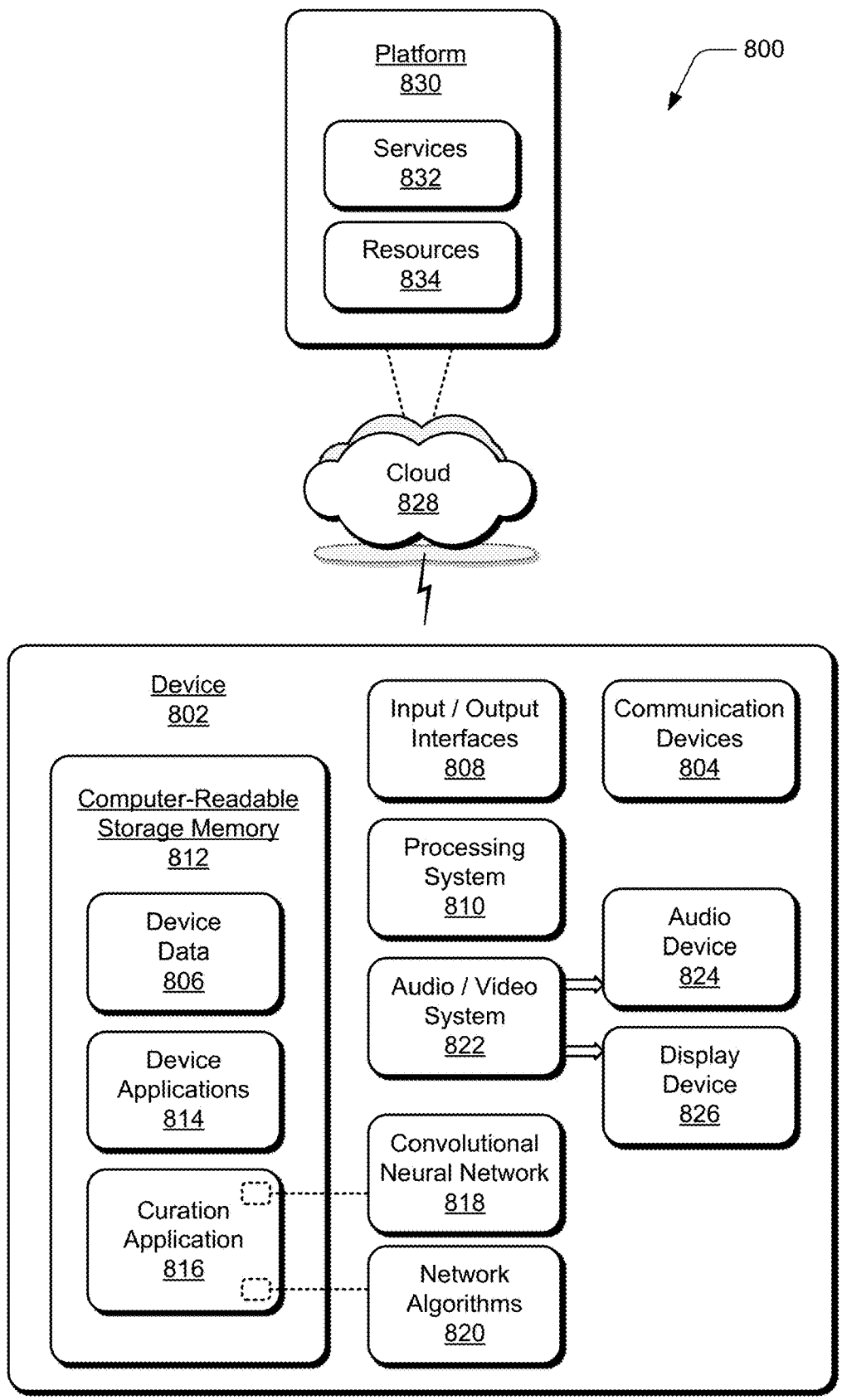
FIG. 8 illustrates an example system with an example device that can implement embodiments of event image curation.

FIG. 8 illustrates an example system 800 that includes an example device 802, which can implement embodiments of event image curation. The example device 802 can be implemented as any of the computing devices and/or services (e.g., server devices) described with reference to the previous FIGS. 1-7, such as the computing device 402 and/or server devices of the cloud-based service 412.

The device 802 includes communication devices 804 that enable wired and/or wireless communication of device data 806, such as the data batches 302, the collection of digital images 106, the event types 108, the sequence of items 124, and other computer applications content that is maintained and/or processed by computing devices. The device data can also include any type of audio, video, image, and/or graphic data that is generated by applications executing on the device. The communication devices 804 can also include transceivers for cellular phone communication and/or for network data communication.

The device 802 also includes input/output (I/O) interfaces 808, such as data network interfaces that provide connection and/or communication links between the example device 802, data networks, and other devices. The I/O interfaces can be used to couple the device to any type of components, peripherals, and/or accessory devices, such as a digital camera device that may be integrated with device 802. The I/O interfaces also include data input ports via which any type of data, media content, and/or inputs can be received, such as user inputs to the device, as well as any type of audio, video, image, and/or graphic data received from any content and/or data source.

The device 802 includes a processing system 810 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 802 may further include any type of a system bus or other data and command transfer system that couples the various components within the device. A system bus can include any one or combination of different bus structures and architectures, as well as control and data lines.

The device 802 also includes computer-readable storage memory 812, such as data storage devices that can be accessed by a computing device, and that provide persistent storage of data and executable instructions (e.g., software applications, modules, programs, functions, and the like). The computer-readable storage memory 812 described herein excludes propagating signals. Examples of computer-readable storage memory 812 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 812 provides storage of the device data 806 and various device applications 814, such as an operating system that is maintained as a software application with the computer-readable storage memory and executed by the processing system 810. In this example, the device applications also include a curation application 816, which implements a convolutional neural network 818 and network algorithms 820, that implement embodiments of event image curation, such as when the example device 802 is implemented as the computing device 402 shown and described with reference to FIG. 4. Examples of the curation application 816, the convolutional neural network 818, and the network algorithms 820 (e.g., to include the piecewise ranking loss algorithm 312, the face detection algorithm 204, and the physical features detection algorithm 218) include the curation application 102 and the convolutional neural network 104 that are implemented by the computing device 402 and/or by the cloud-based service 412, as shown and described with reference to FIG. 4.

The device 802 also includes an audio and/or video system 822 that generates audio data for an audio device 824 and/or generates display data for a display device 826. The audio device and/or the display device include any devices that process, display, and/or otherwise render audio, video, display, and/or image data, such as the image content of an animation object. In implementations, the audio device and/or the display device are integrated components of the example device 802. Alternatively, the audio device and/or the display device are external, peripheral components to the example device. In embodiments, at least part of the techniques described for event image curation may be implemented in a distributed system, such as over a "cloud" 828 in a platform 830. The cloud 828 includes and/or is representative of the platform 830 for services 832 and/or resources 834. For example, the services 832 may include the cloud-based service shown and described with reference to FIG. 4.

The platform 830 abstracts underlying functionality of hardware, such as server devices (e.g., included in the services 832) and/or software resources (e.g., included as the resources 834), and connects the example device 802 with other devices, servers, etc. The resources 834 may also include applications and/or data that can be utilized while computer processing is executed on servers that are remote from the example device 802. Additionally, the services 832 and/or the resources 834 may facilitate subscriber network services, such as over the Internet, a cellular network, or Wi-Fi network. The platform 830 may also serve to abstract and scale resources to service a demand for the resources 834 that are implemented via the platform, such as in an interconnected device embodiment with functionality distributed throughout the system 800. For example, the functionality may be implemented in part at the example device 802 as well as via the platform 830 that abstracts the functionality of the cloud 828.

Although embodiments of event image curation have been described in language specific to features and/or methods, the appended claims are not necessarily limited to the specific features or methods described. Rather, the specific features and methods are disclosed as example implementations of event image curation, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method for event image curation, the method comprising:
   receiving a collection of digital images associated with more than one type of event;
   determining by unsupervised feature learning from the collection of digital images, the types of events and an importance rating of each digital image within each respective type of event, the importance rating of a digital image representative of an importance of the digital image in context of coverage and diversity representing the type of the event; and generating an output of representative digital images from the collection based on the importance rating of each digital image in the context of the respective type of event associated with the digital image.

2. The method as recited in claim 1, wherein the importance rating of a digital image is representative of the coverage and diversity representing the type of the event without consideration of image quality of the digital image.

3. The method as recited in claim 1, wherein:
the collection of the digital images is a digital photo album of digital photos that are associated with the types of events; and
the representative digital images are a set of the digital photos that are representative of important moments during a respective type of the event.

4. The method as recited in claim 3, further comprising:
determining the diversity of the set of the digital photos to identify one or more of the digital photos that represent the important moments during the respective type of the event;
removing duplicate ones of the set of the digital photos based on the determined diversity of the set of the digital photos; and
adding another of the digital photos to the set of the digital photos for an important moment of the respective type of the event that is not represented by the set of the digital photos.

5. The method as recited in claim 1, wherein:
the collection of the digital images are image frames of one or more videos associated with the types of events; and
the representative digital images are a set of the image frames of the one or more videos that are representative of important moments during the respective type of the event.

6. The method as recited in claim 1, further comprising receiving a designation of the types of events as an input to a convolutional neural network that implements the unsupervised feature learning from the collection of digital images.

7. The method as recited in claim 1, wherein:
the types of events are different types of events;
the method further comprising receiving probability designations of the different types of the events; and
wherein said determining the importance rating of each digital image is based at least in part on the probability designations of the different types of the events.

8. The method as recited in claim 1, further comprising:
detecting one or more faces in each of the digital images that include at least one face;
generating a representation of each of the digital images that are detected having the at least one face, the representations of the one or more faces emphasized based on an importance of a person in the context of the respective type of the event; and
wherein said determining the importance rating of each digital image is based at least in part on the representation for each of the respective digital images.

9. The method as recited in claim 8, further comprising:
receiving digital image metadata corresponding to each of the respective digital images, the digital image metadata that corresponds to a digital image designating the importance of the person in the digital image; and
wherein said determining the importance rating of each digital image is based at least in part on the digital image metadata corresponding to each of the respective digital images.

10. The method as recited in claim 8, further comprising:
receiving a user input to one of emphasize the importance of the person in the digital image or deemphasize the importance of the person in the digital image; and
wherein said determining the importance rating of each digital image is based at least in part on the user input as it pertains to one or more of the digital images that include the person.

11. The method as recited in claim 1, further comprising:
detecting physical features of one or more persons in one or more of the digital images;
generating representations of one or more of the physical features emphasized based on an importance of a person in the context of the respective type of the event; and
wherein said determining the importance rating of each digital image is based at least in part on the representations of the one or more physical features for each of the respective digital images.

12. A computing device implemented for event image curation, the computing device comprising:
memory configured to maintain a collection of digital images associated with more than one type of event;
a curation application executed by a processor system, the curation application configured to:
receive the digital images;
determine the types of events and an importance rating of each digital image within each respective type of event, the importance rating of a digital image representative of an importance of the digital image in context of coverage and diversity representing the type of the event; and
generate an output of representative digital images from the collection based on the importance rating of each digital image in the context of the respective type of event associated with the digital image.

13. The computing device as recited in claim 12, wherein the importance rating of a digital image is representative of the coverage and diversity representing the type of the event without consideration of image quality of the digital image.

14. The computing device as recited in claim 12, wherein:
the collection of the digital images is a digital photo album of digital photos that are associated with the types of events; and
the representative digital images are a set of the digital photos that are representative of important moments during a respective type of the event.

15. The computing device as recited in claim 14, wherein the curation application is configured to:
determine the diversity of the set of the digital photos to identify one or more of the digital photos that represent the important moments during the respective type of event;
remove duplicate ones of the set of the digital photos based on the determined diversity of the set of the digital photos; and
add another of the digital photos to the set of the digital photos for an important moment of the respective type of the event that is not represented by the set of the digital photos.

16. The computing device as recited in claim 12, wherein:
the collection of the digital images are image frames of one or more videos associated with the types of events; and
the representative digital images are a set of the image frames of the one or more videos that are representative of important moments during the respective type of the event.

17. The computing device as recited in claim 12, wherein:
the types of events are different types of events;
the curation application is configured to:
receive designations of the different types of the events;
receive probability designations of the different types of the events; and
said determine the importance rating of each digital image based at least in part on the probability designations of the different types of the events.

18. The computing device as recited in claim 12 wherein the curation application is configured to:
detect one or more faces in each of the digital images that include at least one face;
generate a representation of each of the digital images that are detected having the at least one face, the representations of the one or more faces emphasized based on an importance of a person in the context of the respective type of the event; and
wherein the curation application is configured to said determine the importance rating of each digital image based at least in part on the representation for each of the respective digital images.

19. A method for event image curation, the method comprising:
receiving a collection of digital images as an input to a convolutional neural network, the digital images being associated with a type of event;
determining, using the convolutional neural network, one or more important moments having occurred during the event;
determining, using the convolutional neural network, an importance rating of each digital image within the collection of the digital images based on the determined one or more important moments of the event, the importance rating of a digital image determined in context of an important moment that the digital image represents during the event; and
generating an output of representative digital images from the collection based on the importance rating of each digital image as a representation of a respective important moment of the event.

20. A method as recited in claim 18, wherein the importance rating of a digital image is representative of photo coverage of the respective important moment of the event without consideration of image quality of the digital image.

* * * * *